US006499762B1

(12) United States Patent
Rogers et al.

(10) Patent No.: US 6,499,762 B1
(45) Date of Patent: Dec. 31, 2002

(54) FRAME SUPPORT APPARATUS AND COUPLING DEVICE FOR USE WITH AN AMBULATORY SYSTEM AND METHOD OF FABRICATION THEREOF

(75) Inventors: Richard H. Rogers, San Antonio, TX (US); Robert M. Huntress, San Diego, CA (US)

(73) Assignee: Adorno/Rogers Technology, Inc., Austin, TX (US)

(*) Notice: Subject to any disclaimer, the term of this patent is extended or adjusted under 35 U.S.C. 154(b) by 0 days.

(21) Appl. No.: 09/613,487

(22) Filed: Jul. 11, 2000

Related U.S. Application Data

(63) Continuation-in-part of application No. 09/067,511, filed on Apr. 27, 1998, now Pat. No. 6,164,674, which is a continuation-in-part of application No. 08/463,201, filed on Jun. 5, 1995, now Pat. No. 5,782,483.

(51) Int. Cl.[7] ................ B62B 7/08

(52) U.S. Cl. ................ 280/650; 280/250.1; 403/113; 297/45

(58) Field of Search ................ 280/250.1, 42, 280/650, 647, 304.1, 642; 297/42, 45; 403/112, 113, 174, 177, 178

(56) References Cited

U.S. PATENT DOCUMENTS

| | | | | | |
|---|---|---|---|---|---|
| 314,327 | A | | 3/1885 | Gerbracht | 280/42 |
| 567,669 | A | | 9/1896 | Weinstock | 280/42 |
| 581,013 | A | | 4/1897 | Serber et al. | 280/42 |
| 720,623 | A | * | 2/1903 | Russel | 403/178 |
| 1,357,073 | A | * | 10/1920 | Mooney | 403/178 |
| 2,657,737 | A | * | 11/1953 | Kanaval | 297/42 |
| 3,024,035 | A | | 3/1962 | Tapiovaara | 280/47.4 |
| 3,937,490 | A | | 2/1976 | Mohamed | 280/242 WC |
| 4,007,947 | A | | 2/1977 | Perego | 280/642 |
| 4,042,250 | A | | 8/1977 | Rodaway | 280/42 |
| 4,046,374 | A | | 9/1977 | Breyley | 272/70.3 |
| 4,083,598 | A | | 4/1978 | Thomas | 297/45 |
| 4,287,619 | A | | 9/1981 | Brewer et al. | 4/483 |
| 4,324,410 | A | | 4/1982 | Perego | 280/42 |
| 4,343,482 | A | | 8/1982 | Wegner | 280/42 |
| 4,386,790 | A | | 6/1983 | Kassi | 280/650 |
| 4,462,604 | A | | 7/1984 | Meyer | 280/242 WC |
| 4,577,878 | A | | 3/1986 | Roy et al. | 280/242 WC |
| 4,595,232 | A | * | 6/1986 | Glenn et al. | 297/45 |

(List continued on next page.)

FOREIGN PATENT DOCUMENTS

| | | | |
|---|---|---|---|
| DE | 34 35 990 A1 | 4/1986 | B62B/3/02 |
| WO | WO 96-39320 | 12/1996 | B62B/11/00 |

*Primary Examiner*—Avraham Lerner
(74) *Attorney, Agent, or Firm*—Baker Botts L.L.P.

(57) ABSTRACT

A frame support apparatus and coupling device for use with an ambulatory system and method of fabrication thereof. In one embodiment an ambulatory system having a frame support is provided. The ambulatory system includes a first side frame having a front portion and a rear portion, a second side frame having a front portion and a rear portion and a frame support coupled between the first side frame and the second side frame. The frame support includes a first cross-member having a first end and a second end, the first end pivotably coupled to a coupler. The system further includes a second cross-member having a first end and a second end, the first end of the second cross-member coupled to the coupler. Wherein the first end of the second cross-member is maintained in a substantially fixed position relative to the coupler.

9 Claims, 12 Drawing Sheets

U.S. PATENT DOCUMENTS 4,598,921 A 7/1986 Fenwick .............. 280/242 WC
4,629,246 A 12/1986 Fulton .......................... 297/44
4,641,848 A 2/1987 Ayers .................. 280/242 WC
4,643,481 A 2/1987 Saloff et al. ................ 297/458
4,648,619 A 3/1987 Jungnell et al. ............ 280/650
4,712,830 A 12/1987 Charbrol et al. .............. 297/42
4,779,878 A 10/1988 Betts et al. ................... 280/42
4,779,885 A 10/1988 Zinn ................... 280/289 WC
4,861,056 A 8/1989 Duffy, Jr. et al. ........ 280/250.1
4,863,181 A 9/1989 Howle ..................... 280/250.1
4,934,722 A 6/1990 Goetzelman ............. 280/250.1
4,989,890 A 2/1991 Lockard et al. ............... 280/42
5,064,211 A 11/1991 Huttenhuis et al. ...... 280/250.1
5,076,390 A 12/1991 Haskins ................... 280/250.1
5,141,250 A 8/1992 Morgan et al. .......... 280/250.1
5,145,197 A 9/1992 Gatti ........................ 280/304.1
5,192,091 A 3/1993 Liu ............................. 280/644
5,217,239 A 6/1993 Koet ....................... 280/250.1
5,253,886 A 10/1993 Weege ......................... 280/39
5,301,964 A 4/1994 Papac ....................... 280/250.1
5,301,970 A 4/1994 Haskins ................... 280/250.1
5,328,183 A 7/1994 Counts ........................ 280/42
5,358,263 A 10/1994 Aldus et al. .................. 280/42
5,496,050 A 3/1996 Geiger et al. ............ 280/250.1
5,727,802 A 3/1998 Garven, Jr. et al. ...... 280/250.1
5,755,455 A 5/1998 Chen et al. ................. 280/642
5,857,688 A 1/1999 Swearingen ............. 280/250.1
5,863,061 A 1/1999 Ziegler et al. .............. 280/642
5,915,709 A 6/1999 Radjenovic et al. ..... 280/250.1

* cited by examiner

FRAME SUPPORT APPARATUS AND COUPLING DEVICE FOR USE WITH AN AMBULATORY SYSTEM AND METHOD OF FABRICATION THEREOF

RELATED APPLICATIONS

This is a continuation-in-part application of application Ser. No. 09/067,511, filed Apr. 27, 1998 entitled "Variable Width Wheelchair Frame", now U.S. Pat. No. 6,164,674 which is a continuation-in-part application of application Ser. No. 08/463,201, filed Jun. 5, 1995, entitled "Adjustable Wheelbase Wheelchair", now issued as U.S. Pat. No. 5,782,483.

TECHNICAL FIELD OF THE INVENTION

The present invention relates to ambulatory systems and, more particular, to a frame support apparatus and coupling device for use with an ambulatory system and method of fabrication thereof.

BACKGROUND OF THE INVENTION

Because wheelchairs must obviously have a high degree of stability for remaining upright when, for example, their users traverse sloped surfaces or effect rapid turns, traditional wheelchairs with fixed wheelbase dimensions are designed with suitably large wheelbase dimensions. A wheelchair with fixed wheelbase dimensions is an impediment to wheelchair users in many contexts. For example, maneuvering into small washrooms, around cramped office quarters, and through interior doors of most homes often makes access impossible. According to a survey by "Independent Living", it costs an average of $8000 to make an average home wheelchair accessible.

Another problem relating to excessive width of a standard wheelchair's wheelbase dimensions relates to air travel. Wheelchairs of standard dimension will not pass down an airliner aisle. This necessitates the transfer from one's regular wheelchair to one of the airline's uncomfortable and humiliating "people dollies."

These problems have been recognized, and attempts have been made to address the problem. There are, for example, wheelchairs the wheel base of which can be adjusted in width. However, such chairs as are adjustable in length and/or width are designed for incremental and semi-permanent adjustments, not for ad hoc, easily reversible, on-the-fly adjustments as for temporarily dealing with obstacles which either can only be, or can more easily be traversed by a narrower wheelchair.

There exists a need among wheelchair users (of which inventor, Richard Rogers, is one) for a wheelchair (1) which adjusts in wheelbase dimensions; and (2) is adjustable on-the-fly, by the user alone to a width no greater than the seat. Despite the hundreds of wheelchair designs on the market, or depicted in wheelchair related patents, not one appears to address these objectives in combination.

It is important to note that the design for the base of the wheelchair of the present invention has application beyond the field of wheelchairs. The novel expandable/retractable base design could be incorporated into any number of wheeled vehicles, carts, automobiles or other equipment for which it would be advantageous to provide an adjustable wheelbase, the operation of which need not affect the overlying remainder of the vehicles, etc. One example of an application of the present design which is extremely far afield of the wheelchair art would be that of an industrial crane. An expansive wheelbase is desirable for most cranes. However, the wheelbase dimensions are quite limited for a vehicle-based crane which must travel by roadways. The traditional solution for providing a more stable base is to use outriggers. This, however, impedes ready movement of the crane about a work site once the outriggers are extended. Use of the subject base design would address this problem, as will be apparent following an exposition of the present design and its operation.

SUMMARY OF THE INVENTION

It is an object of the present invention to provide a novel and unobvious vehicular chassis the wheelbase dimensions of which are adjustable with respect to width.

It is another object of the present invention to provide a novel and unobvious wheelchair which provides for the adjustment of wheel base dimensions with respect to width.

It is another object of the present invention to provide a novel and unobvious wheelchair which permits on-the-fly adjustment of the width of the wheelbase.

It is another object of the present invention to provide a novel and unobvious wheelchair which permits on-the-fly, adjustment of the width of the wheelbase solely through application of compressive or expansive force to the wheels. It is another object of the present invention to provide a ambulatory system that overcomes some of the deficiencies of current systems which may require such functions as expanding and contracting in increments effected by complex and semi-permanent adjustments between uses of the chairs which may lead to very unstable frame characteristics.

In satisfaction of these and related objectives, the present invention provides a novel design for a vehicular chassis the wheelbase dimensions of which are adjustable. The preferred embodiment of the present invention is as part of a wheelchair which permits its user to contract the wheelbase for traversing narrow passageways or fitting into small spaces.

According to one aspect of the present invention, a frame support apparatus for an ambulatory device is provided. The frame support includes a first cross-member having a first end and a second end wherein the first end coupled to a couple and a second cross-member having a first end and a second end wherein the first end of the second cross-member coupled to the coupler. The first cross-member of the device is maintained substantially coplanar to the second cross-member.

According to another aspect of the present invention a coupling device for a frame support operable to be used in association with an ambulatory system is provided. The coupling device includes an upper plate having at least one pivot location and a lower plate positioned at a distance from the upper plate, wherein the lower plate is substantially parallel to the upper plate. The coupling device further includes the upper plate and the lower plate operable to couple a first member having a first end and a second end wherein the first end positioned between the upper plate and the lower plate and wherein the upper plate and the lower plate are operable to couple a second member having a first end and a second end. The coupling device is further operable to couple the first end of the second member between the upper plate and the lower plate such that the first cross member and the second cross member are maintained substantially co-planar.

According to another aspect of the present invention, an ambulatory system having a frame support is provided. The ambulatory system includes a first side frame having a front portion and a rear portion, a second side frame having a front portion and a rear portion and a frame support coupled between the first side frame and the second side frame. The frame support includes a first cross-member having a first end and a second end wherein the first end pivotably coupled to a coupler and a second cross-member having a first end and a second end wherein the first end of the second cross-member coupled to the coupler. The frame support further includes the first end of the second cross-member maintained in a substantially fixed position relative to the coupler.

According to another aspect of the present invention, a method of manufacturing a frame support for and ambulatory system is provided. The method includes providing a first cross-member having a first end and a second end, coupling the first end of the first cross-member to a coupler, providing a second cross-member having a first end and a second end, coupling the first end of the second cross-member to the coupler. The method further includes maintaining the first cross-member and the second cross-member substantially coplanar.

Additional technical advantages should be readily apparent from the drawings, description, and claims.

DETAILED DESCRIPTION OF THE INVENTION

Figure 1:
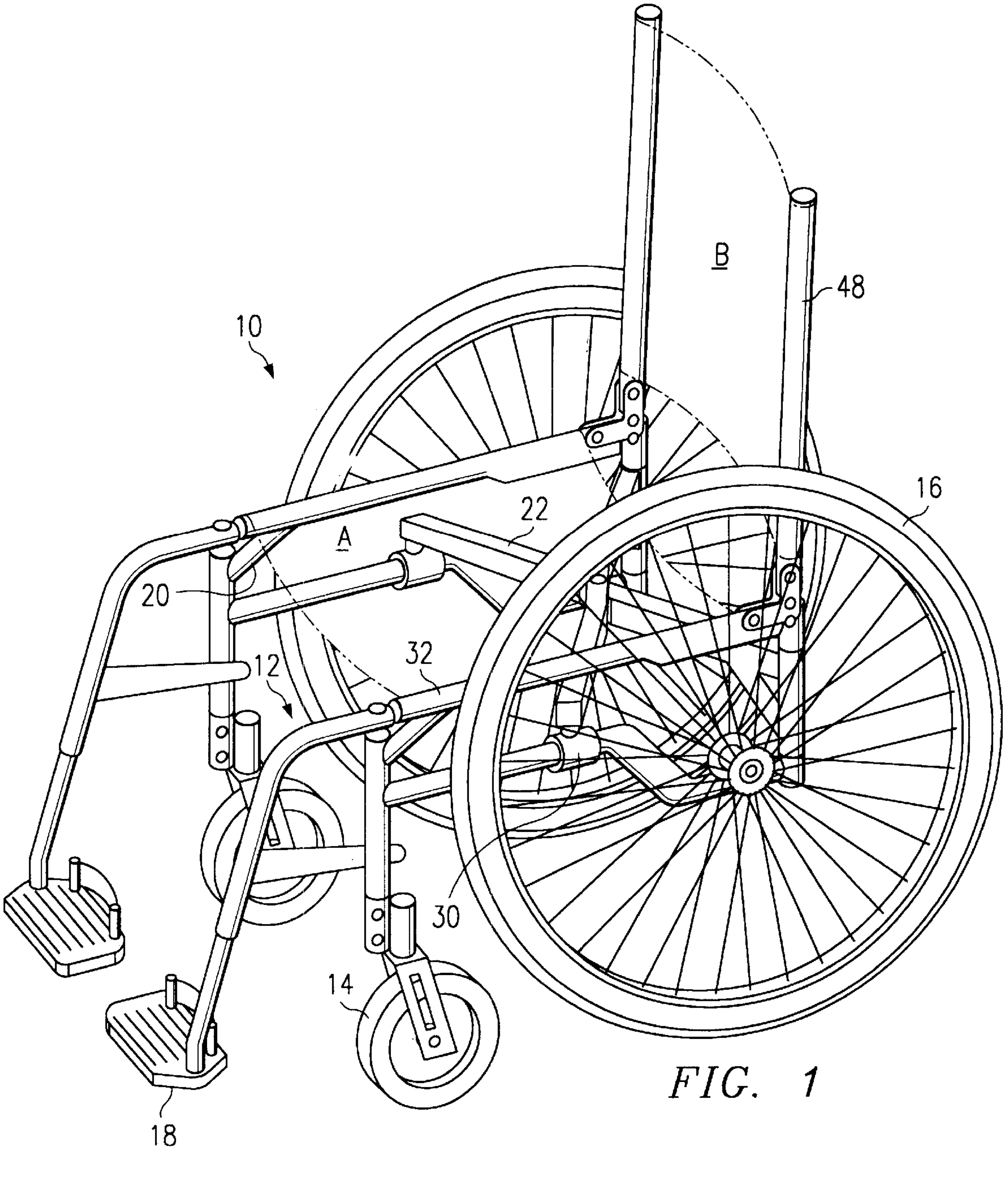
FIG. 1 is a perspective view of the preferred embodiment of the wheelchair of the present invention in an expanded configuration.
Figure 2:
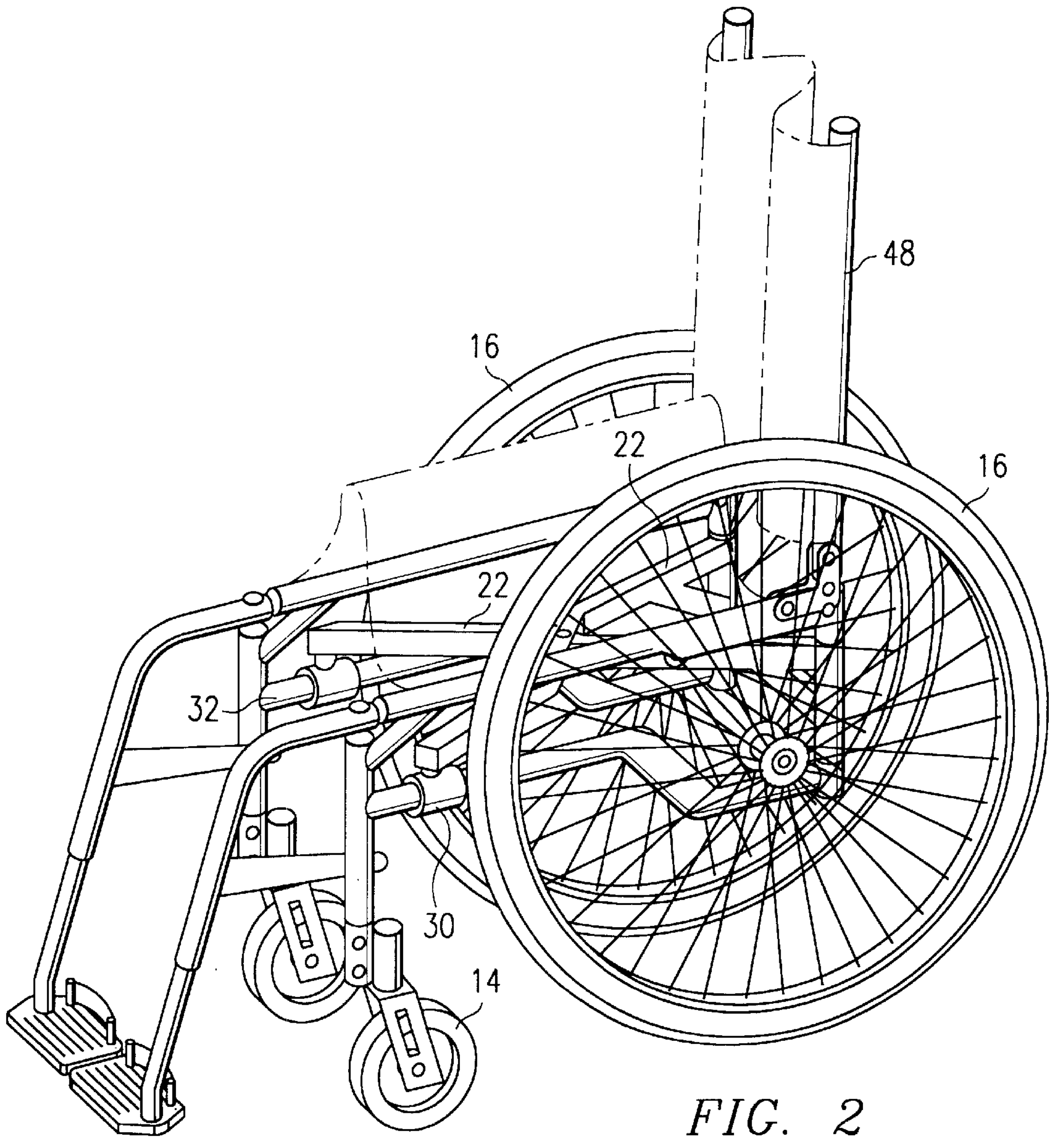
FIG. 2 is a perspective view of the preferred embodiment of the wheelchair of the present invention in a fully contracted configuration.

Referring to FIGS. 1 and 2, illustrations of an ambulatory system of the present invention such as a wheelchair, are identified by the reference numeral 10. Ambulatory system or wheelchair 10 will be used to demonstrate the present design for a vehicle base, but it is to be understood that, as mentioned above, the present invention has utility with other ambulatory systems and devices in addition to fields unrelated to ambulatory systems or wheelchairs.

At its most basic level, wheelchair 10 may be described in terms of several basic operational component systems: a wheelchair frame 12 (to which are attached seat and back supports A and B for directly supporting a rider), forward caster wheels 14, primary wheels 16, and feet supports 18.

Figure 3:
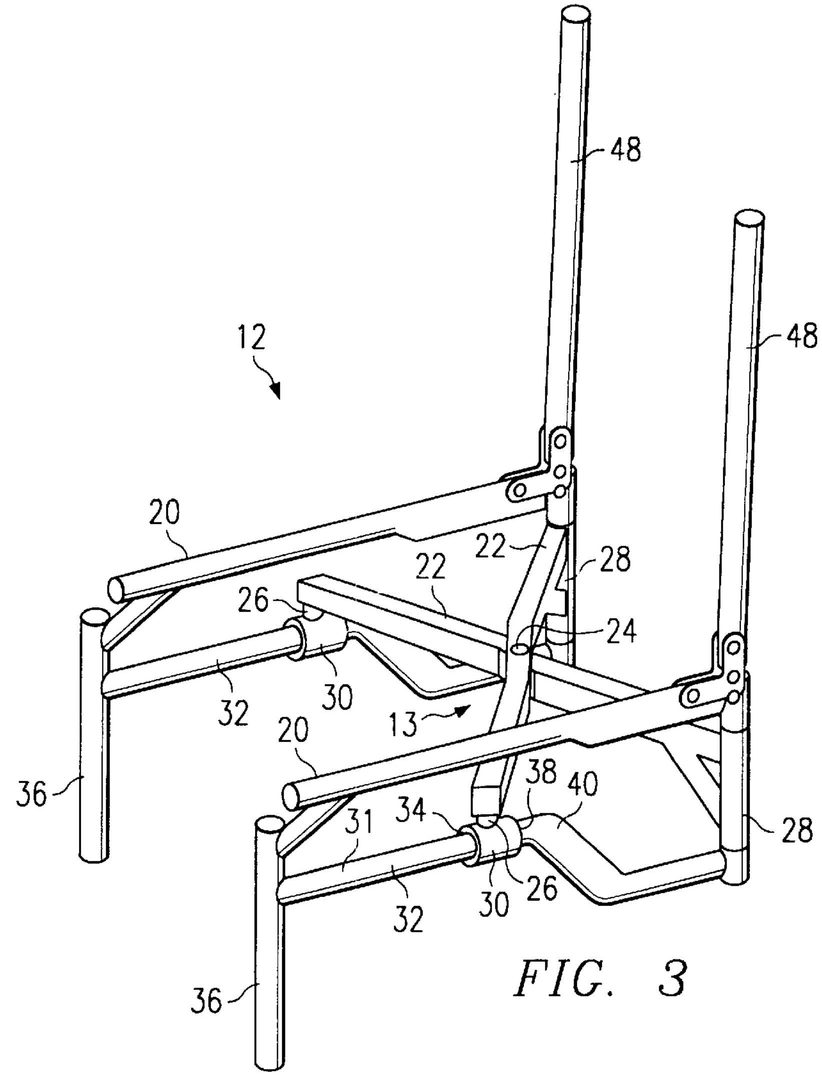
FIG. 3 is a perspective view of the basic frame portion of the wheelchair of the present invention (with wheels and seating removed) in an expanded configuration.
Figure 4:
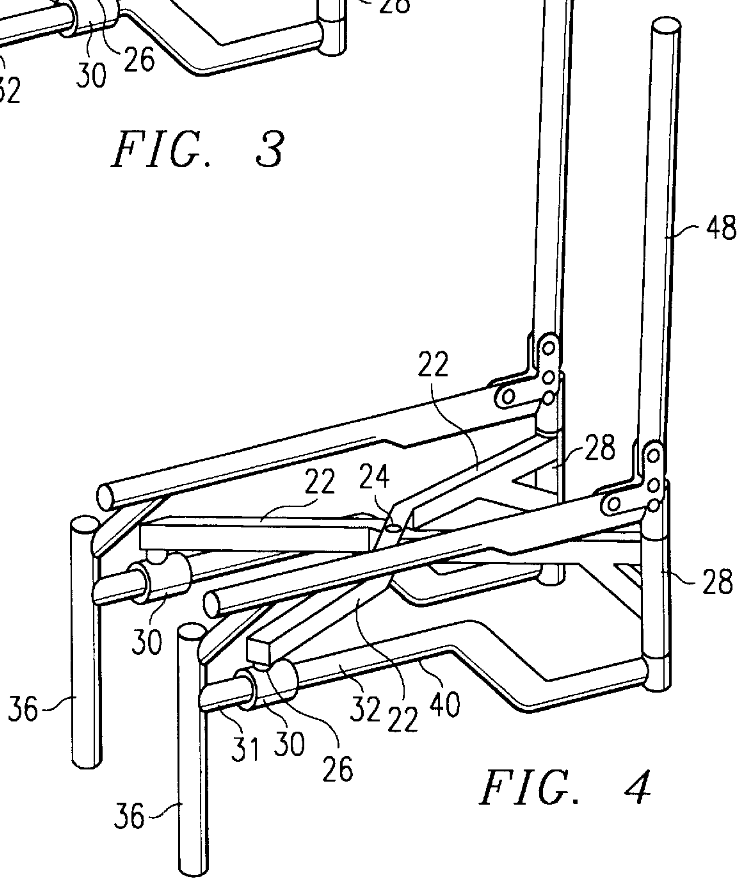
FIG. 4 is a perspective view of the basic frame portion of the wheelchair of the present invention (with wheels and seating removed) in a fully contracted configuration.

Referring primarily to FIGS. 3 and 4, wheelchair frame 12 includes two side frames 20 which are interconnected and mutually supported by way of a pair of scissor-action cross-members 22 in an X configuration. Cross-members 22 pivot, and are secured in a X, scissor-like configuration about, a hub 24. A forward end of each cross-member 22 is pivotally attached to the forward cross-member anchor blocks 26 of side frames 20, of chair 10, while a rearward end of each cross-member 22 is rigidly attached to a rearward cross-member anchor sleeve 28 of the opposite side of the chair 10. In the preferred embodiment of the present invention, each rearward cross-member anchor sleeve 28 is pivotally engaged with a stationary tubular segment (not visible in the drawings) of each respective side frame 20 to accommodate pivotal movement of cross-members 22 (which are rigidly affixed thereto in the preferred embodiment) as side frames 20 move between expanded and contracted configurations (FIGS. 3 and 4 respectively) . In the preferred embodiment, the frame segments to which rearward cross-member anchor sleeves 28 are attached are oriented orthogonally relative to the plane within which cross-members 22 sweep as they execute their scissor-like action.

Each forward cross-member anchor block 26 is attached to a sliding cross-member carriage 30 which is telescopically and slidably engaged with a horizontal segment 32 of each side frame 20. Absent elaborate and unnecessary machinations to avoid such a configuration, horizontal segment 32 of each side frame should, as a practical matter, be oriented in parallel with the plane defined by the sweeps of cross-members 22 and, when frame 12 is assembled, in parallel with the other horizontal segment 32. Such a configuration will allow the desired action of the cross-members 22 and the resulting contracting and expanding movements of side frames 20.

A forward terminal segment 31 of horizontal segment 32 extends from the forward end 34 of cross-member support carriage 30 and joins a wheel assembly support 36 which carries forward caster wheels 14 at such an orientation as to support wheelchair frame 12 in a desired attitude in view of the diameter and relative position of the primary wheels 16 in respect of side frames 20. Extending from the rearward end 38 of each support carriage 30 is a rearward terminal segment 40 of horizontal segment 32.

It is to be understood that the absolute lengths of the segments of each horizontal segment 32 which constitute forward terminal segment 31, intermediate segment 33 (that portion of horizontal segments 32 which reside within cross-member carriages 30), and rearward terminal segment 40 may vary depending on the extent to which wheelchair frame 12 is configured near its most expansive wheelbase configuration, or vice versa. The basis for this variation will be clear from a review of the following portions of this specification.

With reference primarily to FIGS. 3 and 4, it can be appreciated how wheelchair frame 12 operates to simultaneously contract and expand the wheelbase dimensions with respect to width. As side frames 20 are drawn closer together through application of a compressive force, because the rearward cross-member anchor sleeves 28 are not slidably engaged with any portion of side frames 20, and cannot, therefore, move linearly relative to horizontal segments 32, while cross-member carriages 30 are slidably engaged with horizontal segments 32, cross-member carriages 30 slide along horizontal segments 32 to compensate for the altered geometry of the more closely drawn together side frames 20. As a result of contraction of side frames 20, cross-member carriages 30 slide along horizontal segments 32 away from the rearward cross-member anchor sleeves 28, and a portion of the thus far intermediate segments 33 and forward segments 31 of each horizontal segment 32 become rearwardly disposed relative to cross-member carriages 30 (thereby becoming a part of the rearward terminal segment 40. The effect of the reverse operation (applying an expansive force to the side frames 20 to widen the chair's wheelbase) obviously has the reverse effect.

Notwithstanding the dynamics of this expanding and contracting of side frames 20, side frames 20 remain securely linked, and the structural integrity of the wheelchair frame 12 is not changed. The linkage between cross-members 22 and side frames 20, specifically the rigid linkage between the rearward terminal of cross-members 22 and respective side frames 20 (except with respect to pivotal motion in the single plane defined by cross-members 22), and the sliding, telescopic linkage between the forward termini of cross-members 22 and side frames 20, permit easy, on-the-fly contraction and expansion of the wheelchair 10's width, yet ably support side frames 20 in the desired, parallel orientation shown in all the figures as against forces which would tend to collapse the side frames 20 under torque applied by the weight of a rider.

Figure 5:
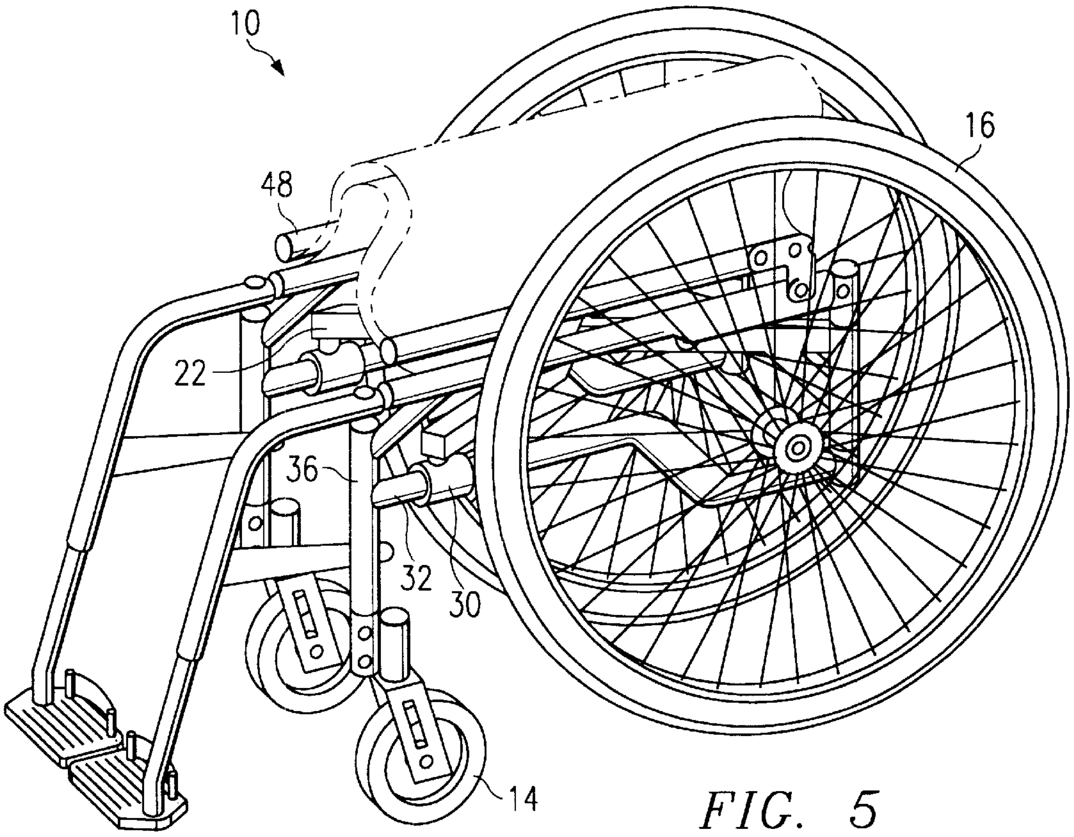
FIG. 5 is a perspective view of the a wheelchair of the present invention in a fully contracted configuration according to one aspect of the present invention.

Referring to FIG. 5, not only do wheelchairs of the present design facilitate ease of use in areas where conventional chairs may not operate, or may be operated only with extreme difficulty for the rider, when configured to include convertible seat back posts 48, wheelchair 10 may be much more easily moved into a compact configuration for transportation, such as in a car trunk, airliner closet, etc. Unlike chairs of old designs which provide for some form of collapsing for storage or transportation, wheelchairs of the present design require no actuation of latches or releases to collapse frame 12 into the most compact configuration. One merely continues movement of side frames 12 toward the extreme of the contraction-directed movement, and flips the seat back posts 48 toward their downward orientation, and the chair is in its compact configuration. Restoring chair 10 to its in-use configuration is just as easily accomplished by reversing the foregoing process.

Although the invention has been described with reference to specific embodiments, this description is not meant to be construed in a limited sense. In particular, it should be recognized that several different types of ambulatory devices such as walkers, carts, etc. may be realized within the scope of the present invention. For example, a three-wheeled vehicle could be designed through practice of the present invention. One version of such a vehicle (not shown in the drawings) might exhibit forward terminal segments 32 of each of the horizontal segments 32 which converge to join with a single forward wheel assembly 36. Provided a sufficient length of the forward terminal segments 32 remain straight before any convergence, to enable normal interaction with the cross-member carriages 30, the same forward and rearward movement as is demonstrated for the two forward wheel assemblies 36 in the preferred embodiment will be seen with a single forward wheel assembly 36.

Figure 6:
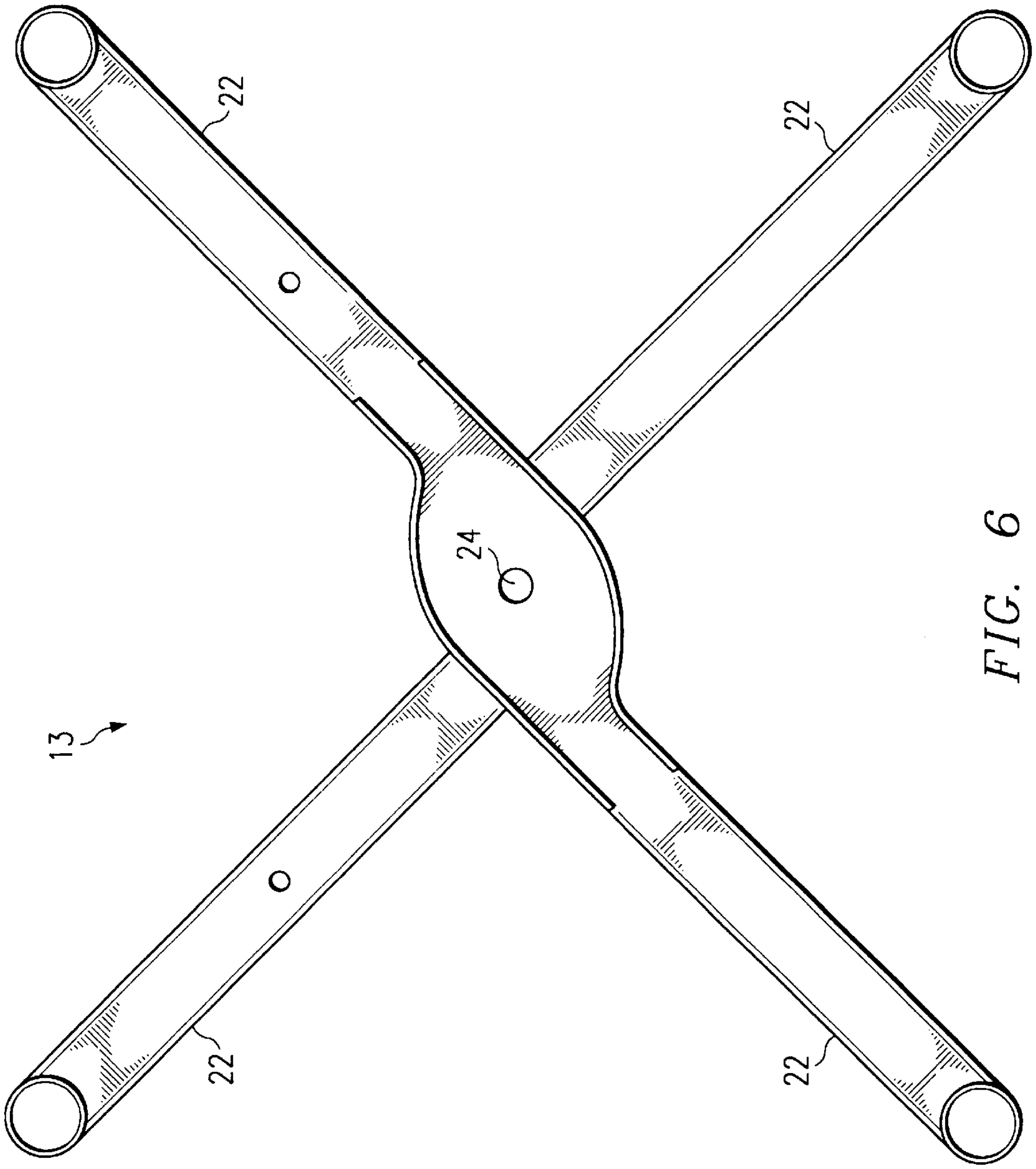
FIG. 6 illustrates a frame support for an ambulatory system in an expanded configuration according to one aspect of the present invention.

FIG. 6 illustrates a frame support for an ambulatory system in an expanded configuration according to one aspect of the present invention. A frame support, shown generally at 13, includes cross-members 22 coupled using a coupler such as coupling hub 24 operable to maintain cross-members 22 substantially coplanar to one another. Frame support 13 is illustrated in an expanded view and may be operable to be used with a wheelchair such as wheelchair 10 of FIG. 1. Cross-members 22 being coplanar advantageously provide support for a frame such as wheelchair frame 12 illustrated in FIG. 3 through reducing undesirable torque's, moments, and instabilities that may be associated with conventional systems.

Figure 7:
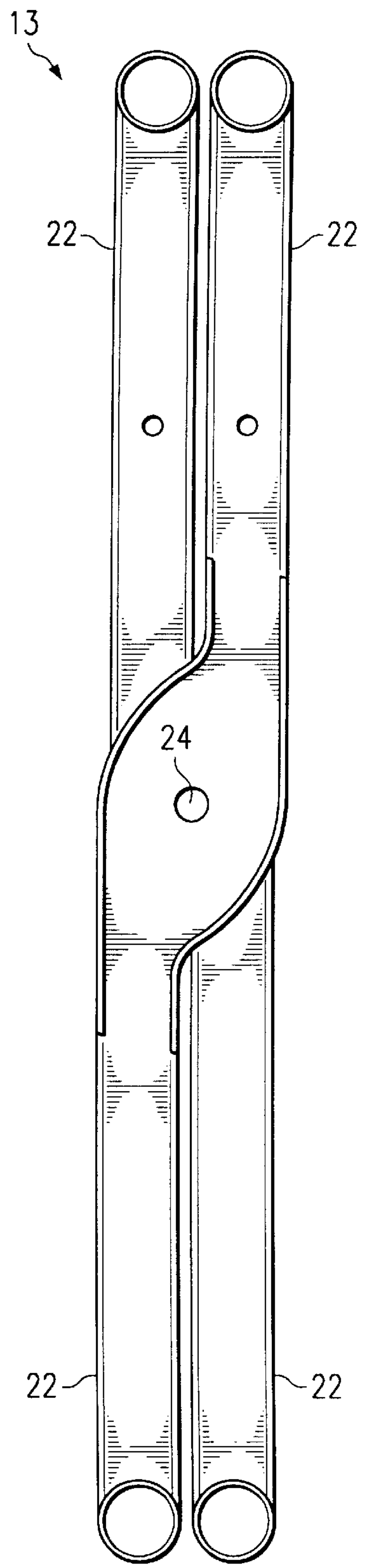
FIG. 7 illustrates the frame support of FIG. 6 in a contracted position according to one aspect of the present invention.

FIG. 7 illustrates frame support 13 in a contracted position. Cross-members 22 are coupled via coupling hub 24 which maintains cross-members 22 substantially coplanar. In one embodiment, cross-members 22 are provided in a substantially parallel configuration. As such, collapsing frame support 13 provides cross-members 22 in a compact configuration.

Figure 8:
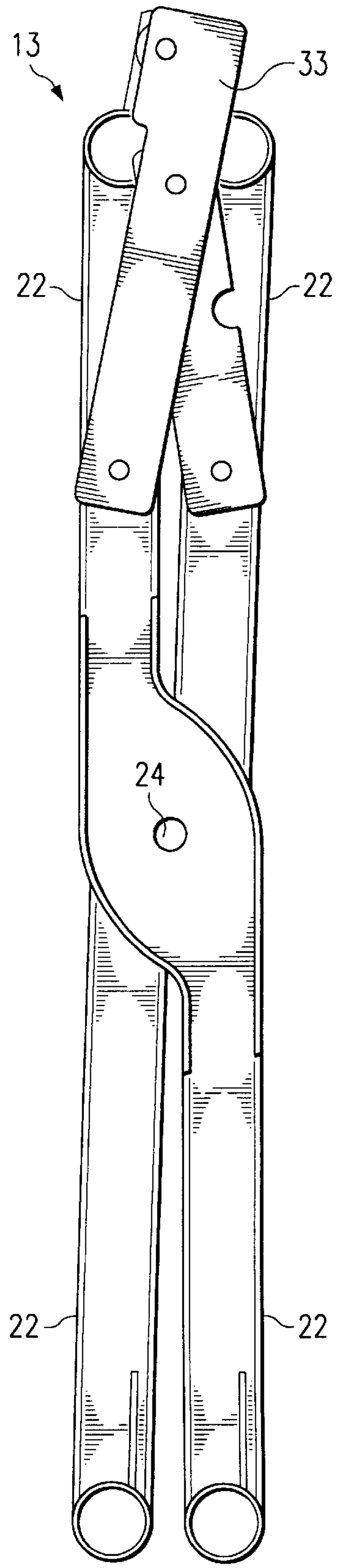
FIG. 8 illustrates the frame support of FIG. 6 incorporating a horizontal coupling member according to one aspect of the present invention.

FIG. 8 illustrates frame support 13 incorporating a horizontal member according to one aspect of the present invention. FIG. 8 as illustrated includes cross-members 22 coupled via coupling hub 23. Frame support 13 also includes horizontal member 33 for providing additional horizontal support for frame support 13. As such horizontal coupling member may be used to provide additional horizontal support for an ambulatory system such as wheelchair 10 of FIG. 1.

Stability of an ambulatory system may be enhanced through providing advantageous derivatives of frame support 13. In one embodiment, a frame support may include a first cross-member and a second cross-member coupled via a coupling hub such that the cross-members are maintained substantially coplanar with respect to each other. This type of configuration advantageously provides increased stability for an ambulatory system while reducing torque effects which may be created by conventional frame supports for ambulatory systems. FIGS. 3 and 4 are exemplary ambulatory systems which utilize cross-members 22 which are coupled to a hub 24 maintained substantially coplanar such that undesirable torque's may be reduced thereby increasing the stability, safety and functionality of an ambulatory system.

Figure 9:
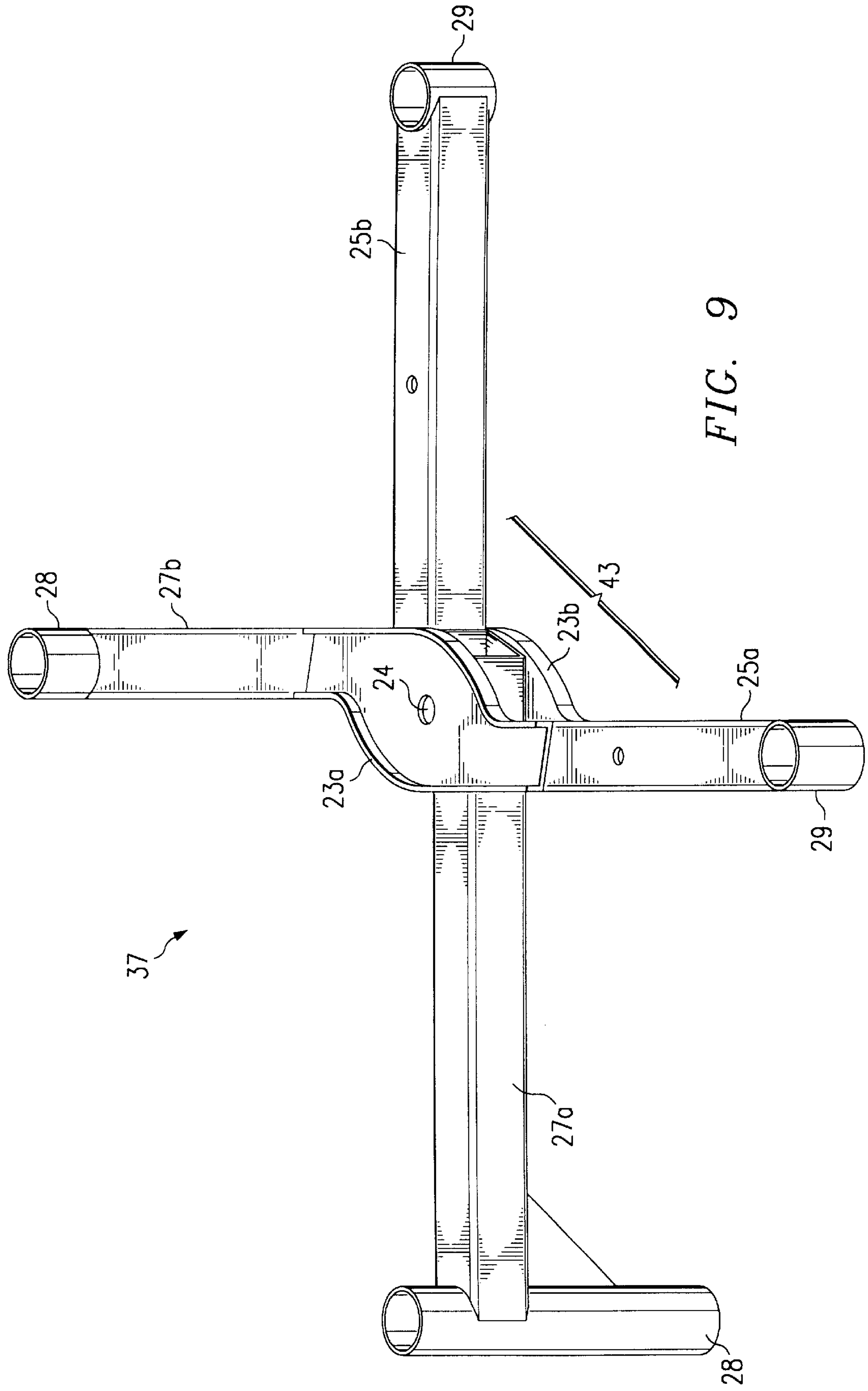
FIG. 9 illustrates an alternate embodiment of a frame support and coupler according to one aspect of the present invention.

FIG. 9 illustrates an alternate embodiment of a frame support and coupler according to one aspect of the present invention. A frame support 37 includes first rearward cross-member **27*a* and second rearward cross-member 27*b* coupled via a coupler 43 to first forward cross-member 25*a* and second forward cross-member 25*b*. Rearward cross-members 27*a* and 27*b* further include rearward cross-member anchor sleeves 28 for engaging a frame of an ambulatory system. Forward cross-members 25*a* and 25*b*** include forward cross-member anchor sleeves for coupling a forward cross-member to a frame of an ambulatory system.

As illustrated in FIG. 9, rearward cross-members 27*a* and 27*b*, and forward cross-member 25*a* and 25*b* may be maintained substantially coplanar with respect to each other. Coupler 43 may provide support for maintaining a coplanar orientation of the cross-members through providing an upper plate 23*a* and a lower plate 23*b* operable to couple the cross-members of frame support 37. In one embodiment, coupler 43 may couple at least one cross-member in a substantial fixed position. Additionally, coupler 43 may pivotably couple at least one of the cross-members of frame support 37. Coupler 43 may also couple at least one rearward cross-member and at least one forward cross-member such that rearward cross-member 27 and forward cross-member 25 are maintained in a parallel configuration. As such, coupler 43 may provide a stable frame support which may be easily contracted or expanded as desired.

In another embodiment, coupler 43 may be operable to maintain the cross-members substantially coplanar. For example, rearward cross-members 27*a* and 27*b* may be positioned between upper plate 23*a* and lower plate 23*b* such that rearward cross-members 27*a* and 27*b* are maintained substantially coplanar. In a similar manner, forward cross-member 25 may be positioned between upper plate 23*a* and lower plate 23*b*. As such, the cross-members may be maintained substantially coplanar thereby reducing undesirable instability of frame support 37.

Figure 10:
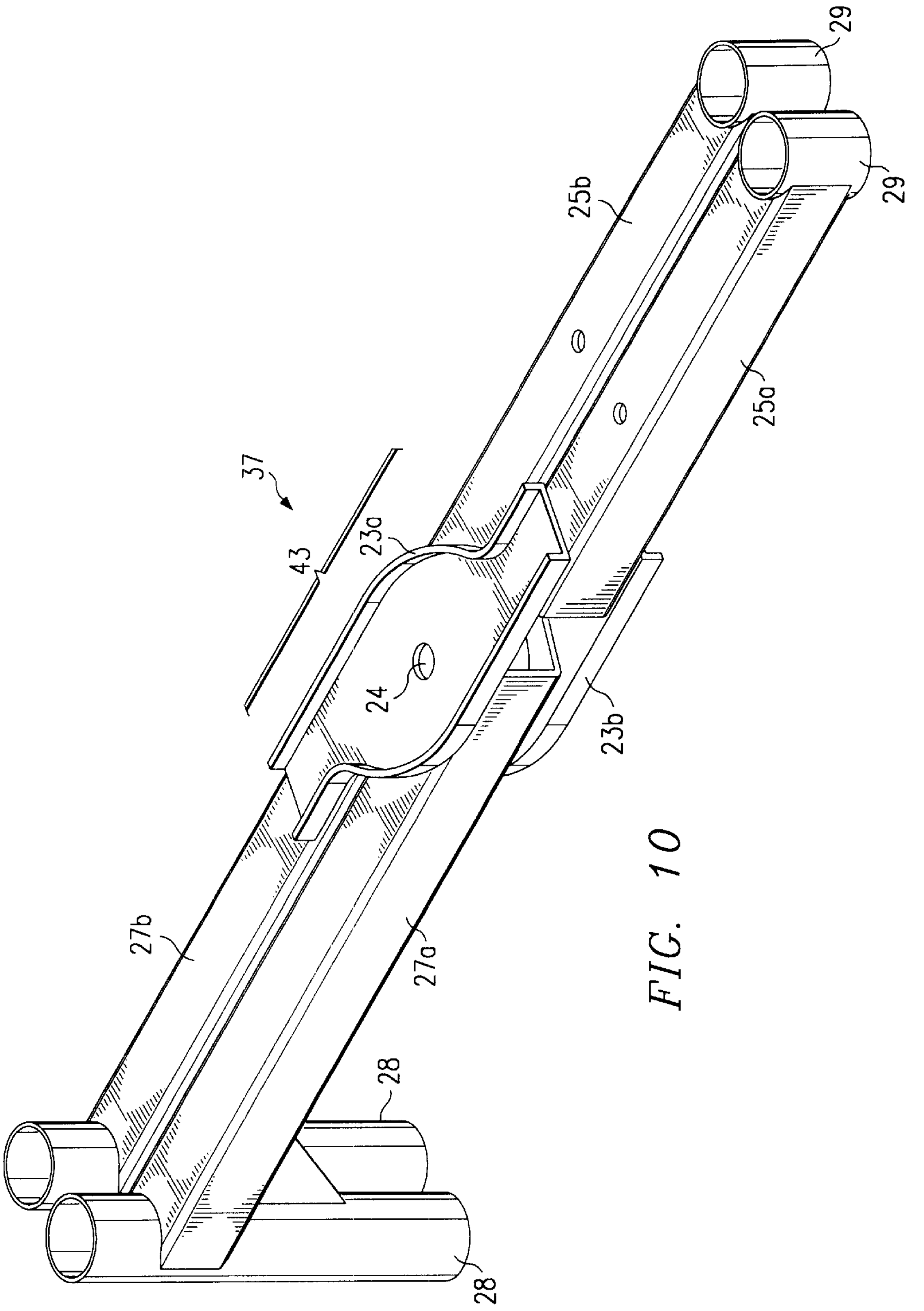
FIG. 10 illustrates the frame support of FIG. 9 in a contracted position according to one aspect of the present invention.

FIG. 10 illustrates the frame support of FIG. 9 in a contracted configuration according to one aspect of the present invention. Frame support 37 includes rearward cross-members 27*a* and 27*b* coupled to forward cross-members 25*a* and 25*b* via coupler 43 which includes an upper plate 23*a* and a lower plate 23*b*. Rearward cross-members 27*a* and 27*b* include rearward cross-member anchor sleeves 28 for coupling frame support 43 to a frame. Additionally, forward cross-members 25*a* and 25*b* include forward cross-member anchor sleeves 29 for coupling frame support 37 to a frame. As illustrated, frame support 37 advantageously provides forward cross-members 25*a* and 25*b* maintained substantially parallel to rearward cross-members 27*a* and 27*b* such that frame support 37 may be efficiently compacted. In one embodiment, first rearward cross-member 27*a* may have a first end coupled to a pivot point, such as hub 24, associated with coupler 43. Additionally, first forward cross-member 25*a* may be substantially fixed to coupler 43 and have a length such that frame support 37 may be contracted and expanded without binding. In a similar manner, second rearward cross-member 27*b* may be substantially fixed to coupler 37 while second forward cross-member may be coupled to a pivot point associated with coupler 37. As such, each cross-member may have lengths which allows frame support 37 to be used in association with an ambulatory system operable to be expanded and contracted efficiently with minimal effort.

Figure 11:
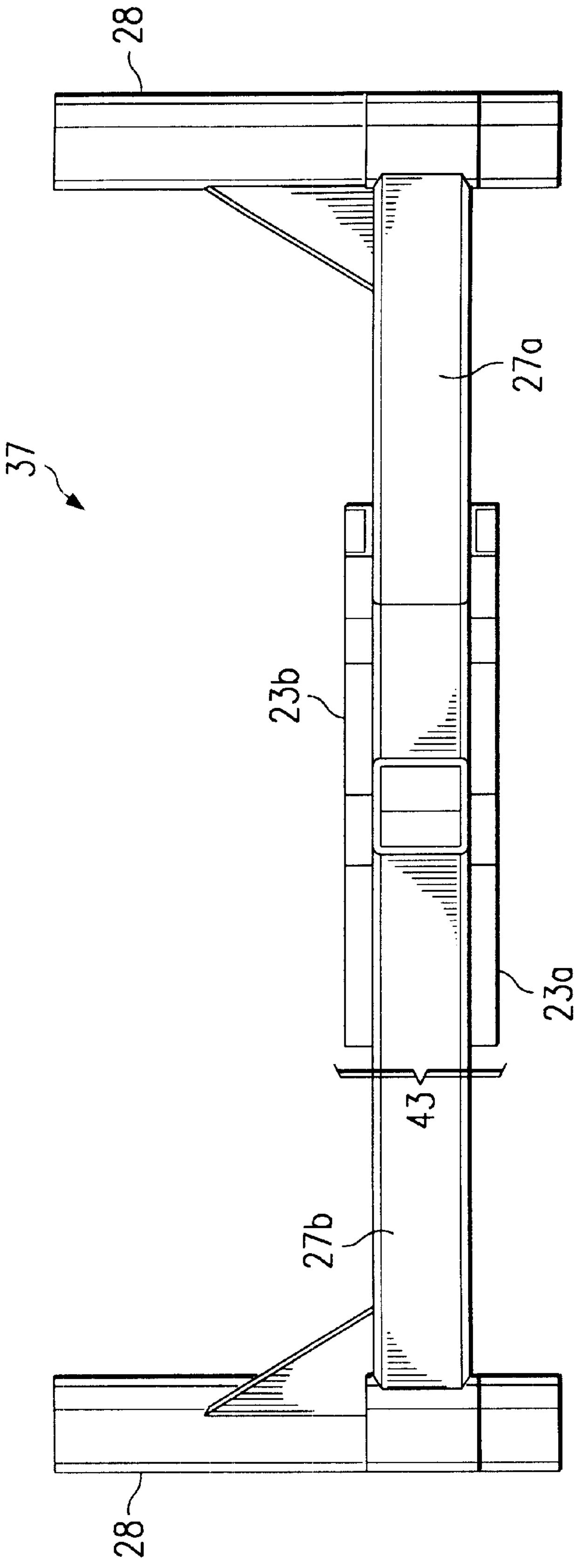
FIG. 11 illustrates a rear perspective view of the frame support of FIG. 9 illustrated in an expanded position according to one embodiment of the present invention.

FIG. 11, is rear view of the frame support of FIG. 9 illustrated in an expanded position according to one embodiment of the present invention. Frame support 37 as illustrated includes rearward cross-member anchor sleeves 28 coupled to rearward cross-members 27*a* and 27*b*. Coupler 43 includes upper plate 23*a* and lower plate 23*b* positioned at a distance to allow functionality of support frame 37. As illustrated, rearward cross-members are maintained substantially coplanar relative to one another such that support frame 37 may be used to provide support for an ambulatory system such as wheelchair 10 of FIG. 1.

Figure 12:
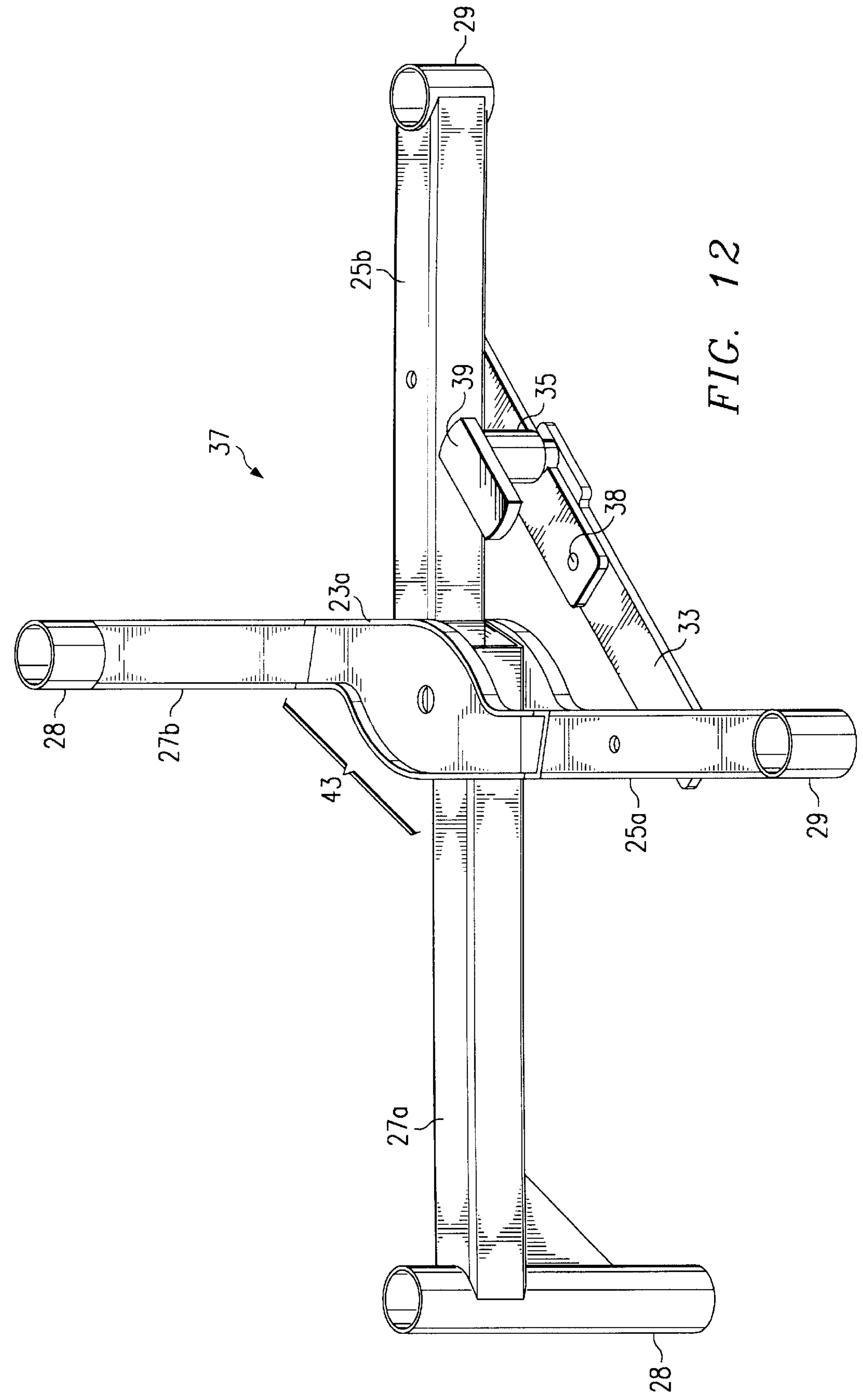
FIG. 12 illustrates the frame support of FIG. 9 including a horizontal cross-member according to one aspect of the present invention.

FIG. 12 is an illustration of the frame support of FIG. 9 including a horizontal cross-member according to one aspect of the present invention. Frame support 37 includes rearward cross-members 27*a* and 27*b* coupled to forward cross-members 25*a* and 25*b* via coupler 43. Frame support 37 further includes horizontal member 33 locking mechanism 35. During use, horizontal coupling member 33 provides horizontal support for frame support 37 when coupled to a wheelchair frame (not shown) via rearward cross-member anchor sleeves 28 and forward cross-member anchor sleeves 29.

Horizontal cross-member 33 may be pivotably coupled between forward cross-members 25*a* and 25*b* such that horizontal cross-member 33 may be expanded and contracted when frame support 37 is used. Horizontal cross-member 33 further includes a pivot point 38 operable to collapse and expand horizontal cross-member 33. Locking mechanism 35 includes a handle 39 operable to fix horizontal cross-member 33 to a desirable position. As such, locking mechanism 35 may be realized in many different configurations without departing from the scope of the present invention. Additionally, horizontal cross-member 33 may include such modifications as a slide track for providing support for various horizontal positions, and/or several notch positions within horizontal cross-member such that a plurality of horizontal positions may be obtained.

Figure 13:
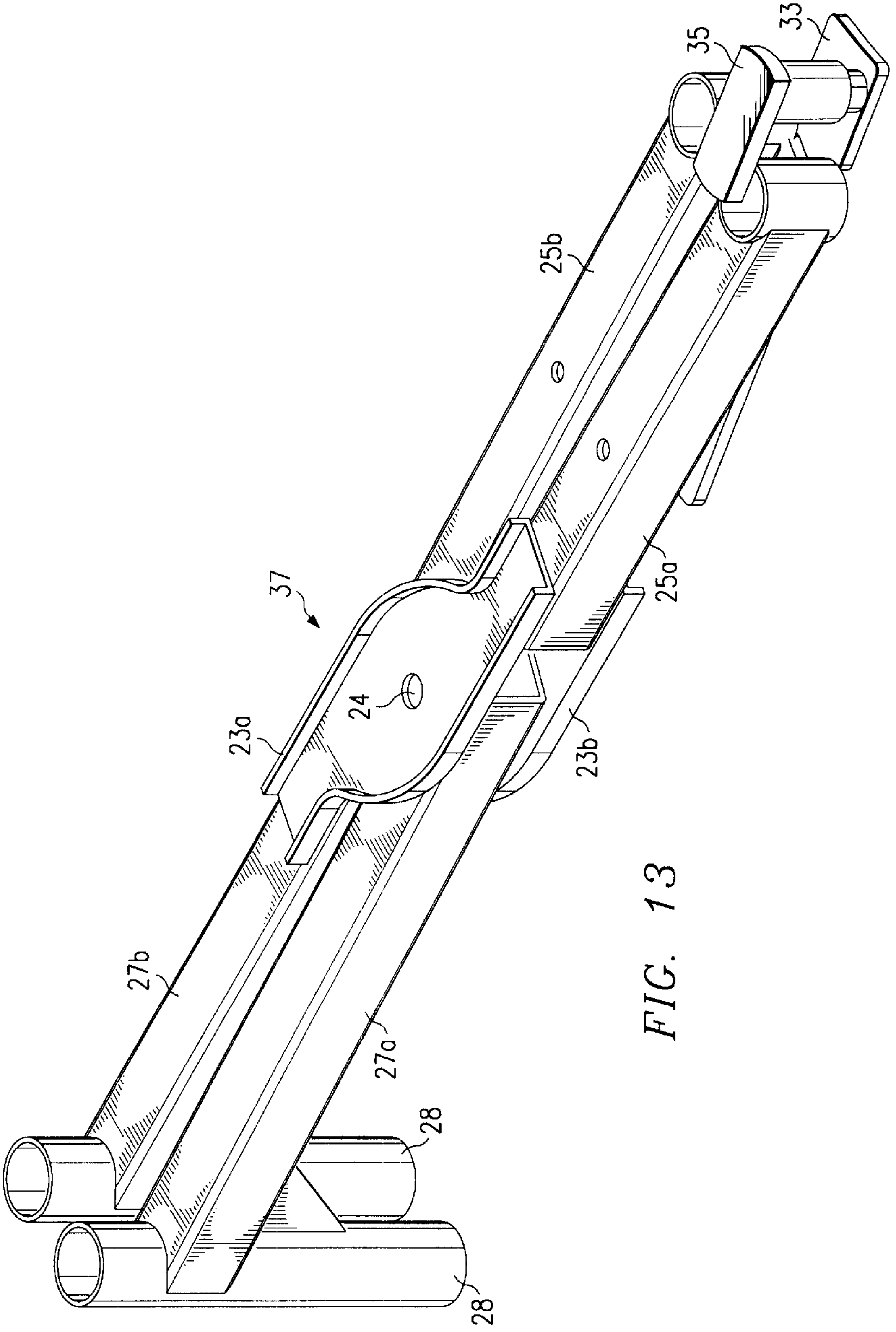
FIG. 13 illustrates a bottom view of the frame support illustrated in FIG. 12 according to one aspect of the present invention.

FIG. 13 illustrates a bottom view of the frame support illustrated in FIG. 12 according to one aspect of the present invention. Frame support 37 includes rearward cross-members 27*a* and 27*b* and forward cross-members 25*a* and 25*b* coupled via coupler 43. Frame support 37 includes horizontal cross-member 33 having locking mechanism 35. During use, upon expanding frame support 37, horizontal cross-member 33 may be locked into a substantially horizontal position to provide additional structural support. As illustrated, horizontal cross-member member 33 is coupled to forward cross-members 25*a* and 25*b* to provide horizontal stability of frame support 37 when coupled to an ambulatory device such as a wheelchair (not shown). However, in other embodiments horizontal coupling member 33 may be configured in other advantageous positions relative to frame support 37. For example, horizontal cross-member may be coupled between first forward cross-member 25*a* and first rearward cross-member 27*a*, or between rearward cross-members 27*a* and 27*b*, etc. such that support may be provided for frame support 37.

Figure 14:
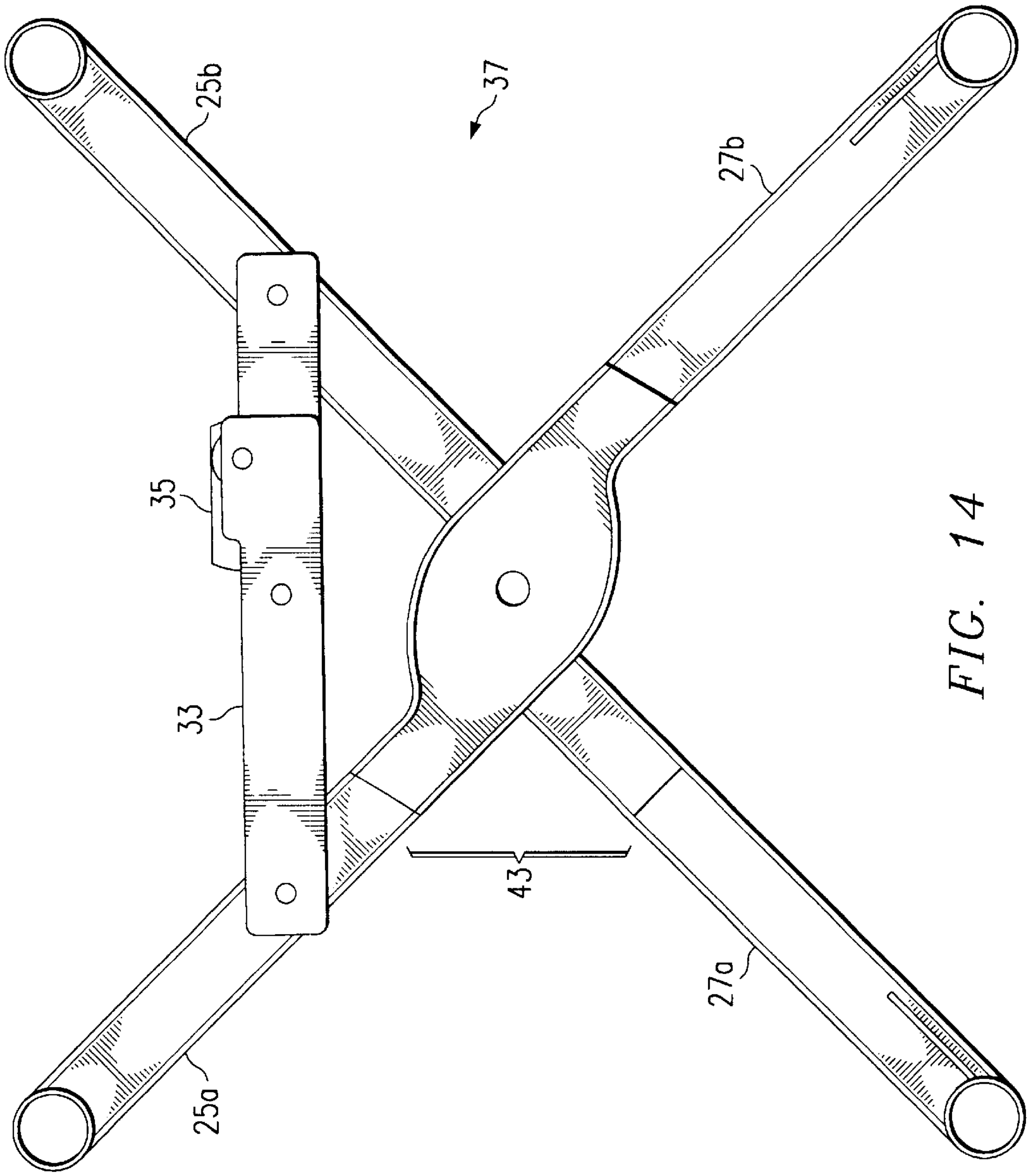
FIG. 14 illustrates the frame support of FIG. 12 in an collapsed position according to one aspect of the present invention.

FIG. 14 illustrates the frame support of FIG. 12 in an collapsed position according to one aspect of the present invention. Forward cross-members 25*a* and 25*b* are coupled to horizontal cross-member 33 such that horizontal support for frame support 37 may be provided when in an expanded position. Horizontal cross-member 33 further includes locking mechanism 35 operable to fix or maintain horizontal cross-member in an expanded position. In a contacted position, horizontal support 33 may be stored adjacent to forward cross-members 25*a* and 25*b* in a compact and unobtrusive manner as illustrated.

Various other modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. A coupling device for a frame support operable to be used in association with an ambulatory device, the coupling device comprising:

an upper plate having at least one pivot location;

a lower plate positioned at a distance from the upper plate, the lower plate substantially parallel to the upper plate;

wherein the upper plate and the lower plate are operable to couple a first cross-member having a first end and a second end, the first end positioned between the upper plate and the lower plate;

wherein the upper plate and the lower plate are operable to couple a second cross-member having a first end and a second end, the first end positioned between the upper plate and the lower plate such that the first cross-member and the second cross-member are maintained substantially coplanar;

wherein the upper plate and the lower plate are operable to couple a fourth cross-member substantially coplanar to the second cross-member;

a third cross member having a first and a second end;

the first cross-member and the third cross-member substantially fixed to the upper plate and the lower plate;

wherein the second and fourth cross-members have first ends which are fixedly joined together by a connection which extends between the first and second plates; and wherein the connection being pivotally connected to the first and second plates and extending between the first ends of the first and third cross-members.

2. The coupling device of claim 1 further comprising an end piece coupled to the first end of the first cross-member, the end piece operable to be coupled to the frame support.

3. The coupling device of claim 1 further comprising a horizontal cross-member coupled to the first cross-member and the third cross-member.

4. The coupling device of claim 3 wherein the horizontal cross-member may be operable to contract about an axis associated with the horizontal cross-member.

5. The coupling device of claim 3 further comprising a locking mechanism operable to substantially fix the horizontal cross-member.

6. The coupling device of claim 1 wherein the first cross-member and the second cross-member comprise rear support members operable to be coupled to a rear portion of the ambulatory device.

7. The coupling device of claim 1 wherein the first cross-member and the third cross-member are offset from an axis associated with the coupling device.

8. The coupling device of claim 1 wherein the first cross-member and the third cross-member are maintained substantially parallel.

9. The coupling device of claim wherein the first cross-member and the third cross-member are offset relative to each other.

* * * * *